Sept. 4, 1951 W. A. MOREY 2,566,354
LUBRICATION FITTING
Filed Feb. 1, 1945 2 Sheets-Sheet 1

INVENTOR.
WOODRUFF A. MOREY
BY
C. E. Herrstrom & H. E. Thibodeau
ATTORNEYS

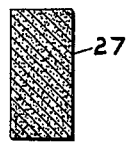 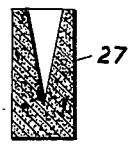 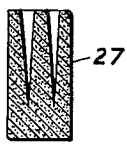
Fig. 9  Fig.10  Fig.11
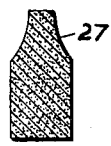 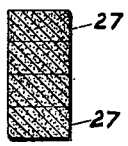 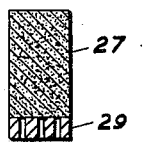
Fig.12  Fig.13  Fig.14
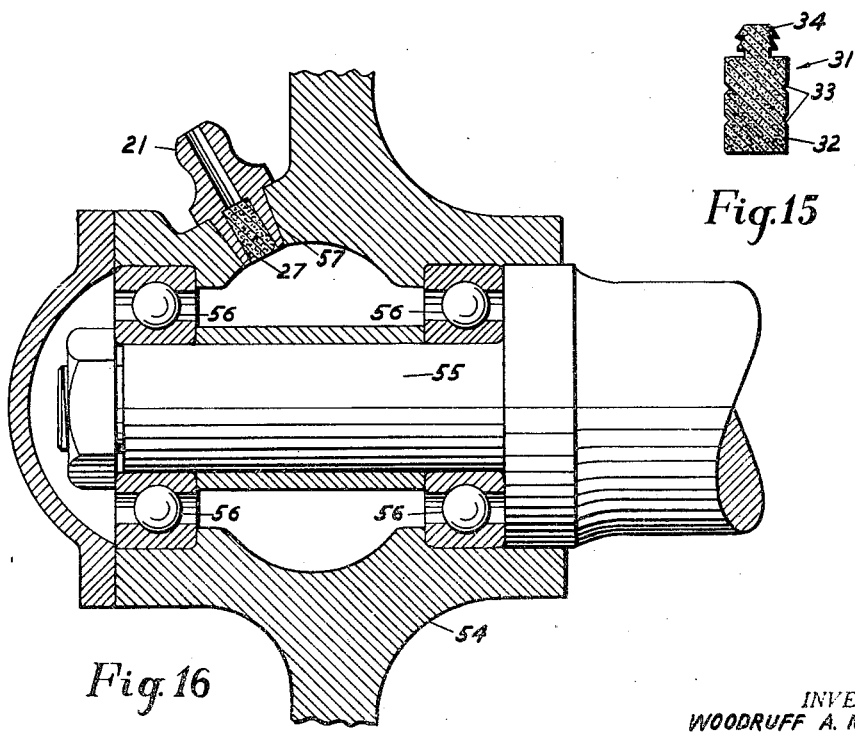
Fig.15
Fig.16

Patented Sept. 4, 1951

2,566,354

UNITED STATES PATENT OFFICE 2,566,354

LUBRICATION FITTING

Woodruff A. Morey, Chicago, Ill.

Application February 1, 1945, Serial No. 575,723

3 Claims. (Cl. 184—105)

(Granted under the act of March 3, 1883, as amended April 30, 1928; 370 O. G. 757)

The invention described herein may be manufactured and used by or for the Government for governmental purposes, without the payment to me of any royalty thereon.

This invention relates generally to lubrication fittings and more specifically to lubrication fittings adapted to deliver clean lubricant to bearing surfaces or other desired points in a machine.

Devices for delivering lubricant, ordinarily under high pressure, to machine bearing surfaces and other points, are known to the art but do not satisfactorily prevent the introduction of abrasive grit or other destructive foreign material into the bearings. The destructive foreign material may be present in the lubricant itself, may accumulate on the head of the lubricant applicator, such as a high pressure grease gun, or may collect on the surface of the fitting.

A primary objective of this invention is to provide a lubrication fitting adapted to remove from a lubricant harmful abrasive grit or foreign material prior to the introduction of the lubricant into the bearing surface or other critical portions of a machine by simple, economical, and structurally strong means.

Another important object of this invention is to simplify the manufacturing procedure and reduce the cost of lubrication fittings.

Other objects of my invention are to provide a fitting which will automatically relieve excessive lubricant pressures built up within a bearing and to provide means for consistently delivering to a bearing surface a predetermined flow of lubricant.

I accomplish these and other objectives by disposing between the head of the fitting, where the lubricant is applied, and the point at which the lubricant is to be used, a filter plug of inorganic material non-reactive to the lubricant employed to which may be consistently imparted in manufacture the desired density and physical strength necessary to the satisfactory removal of foreign material. The filter plug may be formed of a porous ceramic material having tortuous inter-connecting passage ways or other similar materials, but in my preferred embodiment, I employ a filter formed of powdered sintered metal since by the use of this material many advantages not inherent in any other single material or combination of materials may be obtained. For example, a high degree of control of porosity and size of the tortuous inter-connecting passage ways, as well as control of external dimensions, may be commercially obtained with such material.

A more detailed description of my invention, as well as further objects and advantages, will be found in the following specification and drawings in which:

Fig. 1 is a cross sectional view of a drip type oil cup incorporating the principle of this invention.

Fig. 2, 3, 4, and 8 are cross sectional views illustrating various forms of my invention as applied to high pressure lubrication fittings.

Figs. 9 to 14, inclusive, are cross sectional views of filter elements, particularly adapted to the teachings of this invention.

Fig. 15 is a cross sectional view of a form of filter element capable of fitting to a standard lubrication fitting by minor modification thereof.

Fig. 16 is a partial cross sectional view of a roller bearing assembly illustrating an application of this invention to such bearings.

Figure 2:
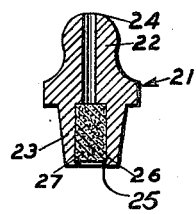

Referring more specifically to the drawings, Fig. 2 illustrates a standard lubrication fitting for high pressure grease guns and customarily comprises a body, generally designated 21, having a nipple 22 and a shank 23 of grease impermeable material, such as steel.

The fitting 21 is provided with a bore 24 and a counter bore 26 in axial alignment, the counter bore 26 ordinarily being of somewhat greater diameter than the bore 24. The precise shape and dimensions of the fitting or the disposition of elements therein, except insofar as they relate to the novel features of this invention are not claimed herein.

Figure 3:
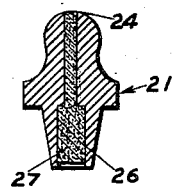

Disposed within counter bore 26 is a filter element 27, said filter being substantially laterally coextensive with counter bore 26 to prevent the passage of lubricant between the filter 27 and the walls of the counter bore 26. The filter may extend upwardly into the counter bore 26 and if desired into the bore 24, the latter described form being illustrated in Fig. 3, it being fundamentally necessary only that the filter have, by virtue of its thickness and inherent strength, sufficient resistance to prevent collapse or breakage upon the application of lubricant under high pressure through the bore 24.

The filter 27 is preferably formed to a diameter slightly large than the counter bore 26 and driven into place within the counter bore, followed by spinning the extremity of the shank 23 inwardly to additionally lock the filter 27 in place, as shown at 25 in Fig. 2. If desired, however, the filter 27 may be formed within the bore 24 and counter bore 26 by inserting the powdered metal and compressing it by suitable means, such as plunger entering from the extremities of the bore 24 and counter bore 26 to the desired density.

Figure 4:
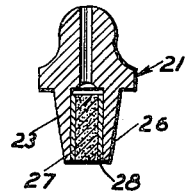

A further method of securing filter element 27 is illustrated in Fig. 4 wherein a lower melting point material 28 is applied to the periphery of the filter 27 or the walls of the counter bore 26 and subjected to heat after assembly within the fitting 21 to braze the filter in place. As at 25 of the form shown in Fig. 2, the extremities of the shank 23 may be spun inwardly in any of these forms. The filter 27 is preferably formed of metal powder initially compressed in a die of the desired form and subsequently sintered to impart strength to the body. This process is generally known as powdered metallurgy and the control of physical properties, such as density, strength, etc., are known to the art.

Selection of the materials, however, which may cover substantially the entire field of metals is of importance to my invention, since the material selected should be either inherently non-reactive to the lubricant to be employed or must be coated or treated with a material non-reactive with such lubricant. Powders of bronze, brass, copper, iron, tin, nickel, zinc, and many others or mixtures thereof may be employed to obtain the desired characteristics. Initial selection of these materials may be based on the chemical and physical constituents of the lubricant employed.

As the size of the particles of foreign material to be removed by the filter decreases, the size of the particles of metal comprising the body of the filter should also decrease and/or the density of the filter, which is controlled primarily by the pressure exerted on the powders while in the die, should increase.

Difference in volume between the loose powder in the die and the volume occupied by the compressed mass is referred to as the compression ratio. It is possible, therefore, to control with reproducible accuracy not only the external dimensions of the filter plug but also the density filter as a whole and the average diameter of the minute tortuous inter-connecting passageways naturally formed therein, which in turn controls the resistance to flow and the maximum diameter of particles which will pass through the body. Although, obviously the permissible maximum diameter of harmful foreign material which may be tolerated will vary widely in each application, the following are given as examples considered generally suitable for automotive use.

As an example of satisfactory mixture, I may employ a mixture comprising of 88% 60 mesh copper powder and 12% 325 mesh zinc powder intimately mixed and compressed to a compression ratio of 4½ to 1. This body after sintering for 30 minutes at 1600° F. in a reducing atmosphere forms a filter body which will remove from ordinary high pressure lubricating grease all particles having a diameter in excess of 25 microns.

As a further example, if a mixture of 88% 60 mesh copper powder and 12% 325 mesh tin powder is compressed at 5 tons per square inch pressure and sintered for 30 minutes at 1600° F. resultant filter body will remove, from ordinary high pressure lubricants, all particles having a diameter in excess of 5 microns. Greater densities may be obtained by increasing the pressures or by re-sintering and repressing or by reducing the size of the non-melting powders employed in the mixture or by other obvious means. It will be noted that the above mixtures include an element which will melt or at least soften at the sintering temperature selected, binding the body together. It should not be understood that this invention is limited to such compositions for many compositions may be formed by true sintering of a single material, such as nickel, in which it is believed that no portion of the metal passes through the liquid phase.

While most lubricants may be considered as substantially neutral, there are several special lubricants which may be noticeably acidic or basic. In addition, change in the lubricant's chemical composition may produce a marked change in its surface tension. The powders selected to form the filter should be non-reactive with the lubricant, particularly in that they should not produce a breakdown of the grease, resulting in a disposition of a heavy relatively insoluble mass upon the metal particles of the filter, such as the soap ordinarily employed in forming grease.

For ordinary use, where only minor contamination is contemplated and relatively high pressures are available, the filter 27 may be formed as a right cylinder as shown in Fig. 9 for insertion within the counter bore 26.

It is sometimes desirable, however, to form the filter element 27 with a non-planer surface exposed to the incoming lubricant in order to increase the filter area available.

Suitable shapes are illustrated in Figs. 10, 11 and 12, in which the upper portion of the filter element 27 is intended to face incoming lubricant. Obviously, other shapes accomplishing the same objectives may be easily formed and are to be considered as within the scope of this invention. Care should be taken, however, to insure that the filter element is sufficiently strong at its thinnest portion to resist the hydraulic pressure of the lubricant. If it is found necessary to employ a weaker filter element, a perforated metal support plate 29 illustrated in Fig. 14 may be employed to support the filter element 27. It is also possible to use combinations of different filter elements, as illustrated in Fig. 13, by forming the elements 27 to the desired diameter and stacking one element on top of the other forming an assembled filter element equalling the desired height for insertion within the body 21.

Emergency field modification of standard lubricating fittings may be made by employing a special shaped filter element, generally designated 31, preferably comprising a right cylindrical body 32 having peripherial grooves 33 cut therein. A neck 34 extends upwardly from the filter body 32 and is shaped as a series of super-imposed truncated cones, the base diameter of said cones being substantially equal to but slightly greater than the diameter of the counter bore 26. The diameter of the body 32 is similarly somewhat larger than the opening in the machine adapted to receive the fitting. To modify a standard fitting, the check valve comprising a ball and spring is removed and the neck 34 is inserted in the counter bore 26. The body 32 is then pressed into the machine opening and is driven firmly therein by the shank of the fitting. The grooves 33 in the body 32 permit breaking off segments to adjust the depth to which the filter 31 is driven by the fitting.

It has been found that, in most cases, the hereinbefore described filter fittings will pass a substantial amount of lubricant, such as grease, before plugging or becoming sufficiently plugged to require excessively high pressures. It has also been found that, to a variable degree depending upon the application, the fittings are self cleaning inasmuch as the lubricant within the bearing will often generate a certain amount of back pressure against the filter causing a very minor reverse flow of grease which removes dirt from the filter surface and passes it outwardly through the bore 24. This reverse flow, in addition to cleaning the filter, also prevents the development of excessive lubricant pressures within the bearing.

The density of the filter controls the amount of pressure which can be retained by the filter, and it is therefore possible, by the use of this fitting, to limit the maximum pressures which can be maintained in a bearing over a period of time. When a filter becomes badly plugged, the fitting can be removed and lubricant, or other suitable liquid, gas or semi-solid, may be forced through the fitting from the rear. This process will nearly always result in completely freeing the filter and removing foreign particles or materials.

Figure 5:
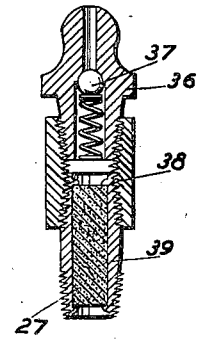
Fig. 5 is a cross sectional view illustrating a means for adapting the teachings of this invention to existing standard lubricant fittings.

There are instances, however, where it is more economical to replace the filter than clean it and also where reverse flow of grease cannot be tolerated. In such instances, I provide an assembly, illustrated in Fig. 5, comprising a standard lubrication fitting 36 containing a ball and spring check valve 37, a coupling 38 and a nipple 39. The coupling 38 is adapted to receive the shank of the fitting 36 and also to receive the nipple 39. In this modification, the filter element 27 is positioned within the nipple 39, the ends of the nipple being spun over as shown. The connections provided by the coupling 38 should be lubricant tight but may, if desired, be removable. For extremely high pressure work, brazing is preferable but for ordinary applications a standard threaded connection as shown may be used. The unengaged end of the nipple 39 is threaded as shown or otherwise formed for attachment to a machine.

The methods of assembling the filter 27 to the nipple 39 may be similar to those previously described in assembling a filter element in the counter bore 26 to a fitting.

Figure 8:
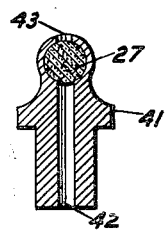

When it is found that the type of foreign material customarily encountered is of such size and composition that it may be removed with relative ease from the filter by wiping, a fitting such as that illustrated in Fig. 8 may be advantageously employed. This fitting comprises a body 41 having a bore 42 extending axially throughout its length. The upper and outer end of the bore 42 is formed to receive the filter element 27 and is subsequently bent around the said element to provide the desired external contour for a lubricant applicator, leaving an opening 43 for entrance of lubricant. It is apparent that as lubricant is applied to this fitting, the filtering will take place adjacent the surface of the fitting before it enters the bore 42 and the greater portion of the foreign material will collect on the surface of the filter 27, where it is accessible for cleaning. In instances where the fitting is exposed to blows, the filter surface should be slightly below the outer extremities of the body 41, as shown, for protection.

Figure 6:
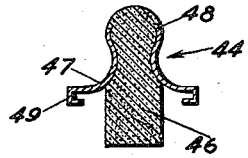
Fig. 6 and 7 are cross sectional views of high pressure lubrication fittings incorporating modifications of the subject invention.

Little difficulty is encountered in forming the filter element 27 to substantially any desired shape since the process of powder metallurgy adapts itself well to the formation of such contours as may be necessary. Advantage may be taken of this characteristic to reduce cost as illustrated in Fig. 6. In this modification the fitting, generally designated 44, comprises a filter body 46 preferably of powdered metal, shaped to fit snugly within the lubricant opening in a machine. A stamped metal section 47 is fitted over the outer end of the filter 46, said filter being shaped and recessed, as indicated at 48 to receive the section 47 and thereby form the desired external contour to receive the lubricant applicator. The function of the grease impermeable metal section 47 is to confine the lubricant to the desired channel and protect the filter element 46.

Lips 49 may be provided, as desired, to abut the body into which the fitting is to be placed, thereby sealing the assembly against lubricant leakage. It is obvious that other shapes may be imparted to the metal section 47 to fit specific applications, for example, lips may be extending downwardly and threaded (not illustrated), but it is desirable to leave exposed the outer extremity of the filter 46 so that it may be cleaned by wiping. Such an assembly may be formed very cheaply since the filter 47 is formed by compressing and sintering the powdered metal, as previously described, and in most instances the metal section 47 can be produced cheaply on a punch press. It is not necessary in all instances, however, to round the head of the filter 46 as illustrated and it may be countersunk for protection.

Figure 7:
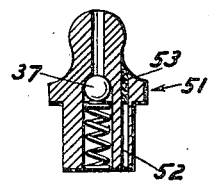

Fig. 7 illustrates an adaption of my invention to relief type fittings wherein means are provided, such as a restricted channel, to permit the reverse flow of lubricant through a fitting in order to prevent high instantaneous pressures within the bearing housing. Referring to Fig. 7, which illustrates one form of a pressure relief fitting, a standard lubrication fitting, generally designated 51, is provided with a channel 52 extending through the shank of the fitting to a point below the check valve 37 and communicating with the outside. The channel 52 is of restricted size so that it will retain in the bearing lubricant up to a certain pressure. It is, in some instances, possible to work dirt and other impurities into the lubricant through this opening. This difficulty can be overcome by inserting in the channel 52 a powdered metal filter 53 to restrain, in any desired degree, the flow of lubricant and still prevent the entry of dirt and other harmful material. When the filter 53 is employed, size of the channel 52 may be increased to compensate for the additional impedance through the filter, and high pressures may be maintained within the bearing if desired.

Fig. 16 illustrates, in general, the application of this invention to a bearing assembly comprising a sealed housing, generally designed 54, having bearings 56 supporting a shaft 55. The housing 54 may be sealed by known means against loss of lubricant. An opening 57 is provided in the bearing housing for the lubricant fitting 21 containing the filter 27. Lubricant is forced into the housing 54 through the fitting 21 passing through the filter 27 which removes any injurious foreign material. After the bearing is loaded with lubricant and operation is started, the heat generated may, in certain instances, create harmful pressures within the bearing. As previously mentioned, the filter 27 will permit the outward flow of grease where pressure within the bearing exceeds the impedance, i. e., resistance to flow of the filter 27.

Figure 1:
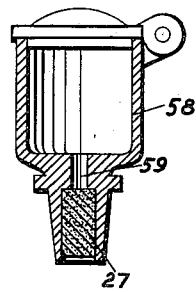

Since the porosity of the powdered metal, preferably employed to form the filter 27, is capable of close control and since the material is machinable the filter can be employed in connection with drip or wick type oilers, such as that illustrated in Fig. 1, comprising an oil cup, generally designated 58, having an opening 59 through which lubricant normally flows. The filter 27 may be inserted in the opening 59 and will act not only as a filter but will also control the rate of passage of the lubricant through the filter.

Preferred forms of the invention have been chosen for illustration and description, in compliance with Section 4888 of the Revised Statues, but persons skilled in the art will readily perceive other means for accomplishing the same results, and the claims are therefore to be construed as broadly as possible, consistent with the prior art.

What I claim is:

1. A lubrication fitting adapted for attachment to a machine comprising a coherent body of powdered metal having tortuous interconnecting passage ways therein, one end of said body forming a head, and a metal section around said head having an opening exposing a portion of said head, the periphery of said metal section being shaped to cooperate with the machine in confining the flow of lubricant to within said body, said head and metal section being formed to receive a lubricant applicator.

2. A grease lubrication fitting for receiving grease from a high pressure gun comprising, in combination, a grease impermeable body having a grease conducting opening extending longitudinally therethrough, said body including at one end thereof a nipple portion receivable by a high pressure grease gun, means in said opening for preventing reverse flow of grease therethrough, a coupling connecting said body at the other end thereof to a second grease impermeable body having a grease conducting opening therein extending longitudinally therethrough in axial alignment with said opening in the first mentioned body, and a grease non-reactive porous grease filter plug capable of withstanding pressure of a high pressure grease gun and consisting of treated powdered metal with only minute grease conducting passages extending therethrough composed of naturally formed tortuous inter-communicating passageways, said plug being rigidly secured in said second body in said opening therein and disposed substantially coextensive laterally with the latter, permitting passage of grease through said minute passages only.

3. A grease lubrication fitting for receiving grease from a high pressure grease gun comprising, in combination, a grease impermeable body having a grease conducting opening extending longitudinally therethrough, said body including at one end thereof a nipple portion receivable by a high pressure grease gun, and a grease non-reactive porous grease filter plug capable of withstanding pressure of a high pressure grease gun and consisting of sintered powdered metal with only minute grease conducting passages extending therethrough composed of naturally formed tortuous inter-communicating passageways, said plug being brazed to said body within said opening and disposed substantially coextensive laterally with the latter, permitting passage of grease in said opening through said minute passages only.

WOODRUFF A. MOREY.

REFERENCES CITED

The following references are of record in the file of this patent:

UNITED STATES PATENTS

| Number | Name | Date |
|---|---|---|
| 1,687,780 | Neale | Oct. 16, 1928 |
| 1,732,579 | Gleason | Oct. 22, 1929 |
| 1,947,586 | Fletcher | Feb. 20, 1934 |
| 1,971,224 | Leaverton | Aug. 21, 1934 |
| 2,217,739 | Ehnts | Oct. 15, 1940 |
| 2,232,359 | Barks | Feb. 18, 1941 |
| 2,250,123 | Boehm | July 22, 1941 |
| 2,259,977 | Kelly | Oct. 21, 1941 |
| 2,297,817 | Truxell | Oct. 6, 1942 |
| 2,361,818 | Brightwell | Oct. 31, 1944 |

FOREIGN PATENTS

| Number | Country | Date |
|---|---|---|
| 418,730 | Great Britain | Oct. 30, 1934 |

OTHER REFERENCES

Product Engineering of October 1932, pages 406 and 407, copy in Div. 45.

Product Engineering of November 1944, pages 769 through 771, copy in Division 45.